United States Patent Office 3,637,778
Patented Jan. 25, 1972

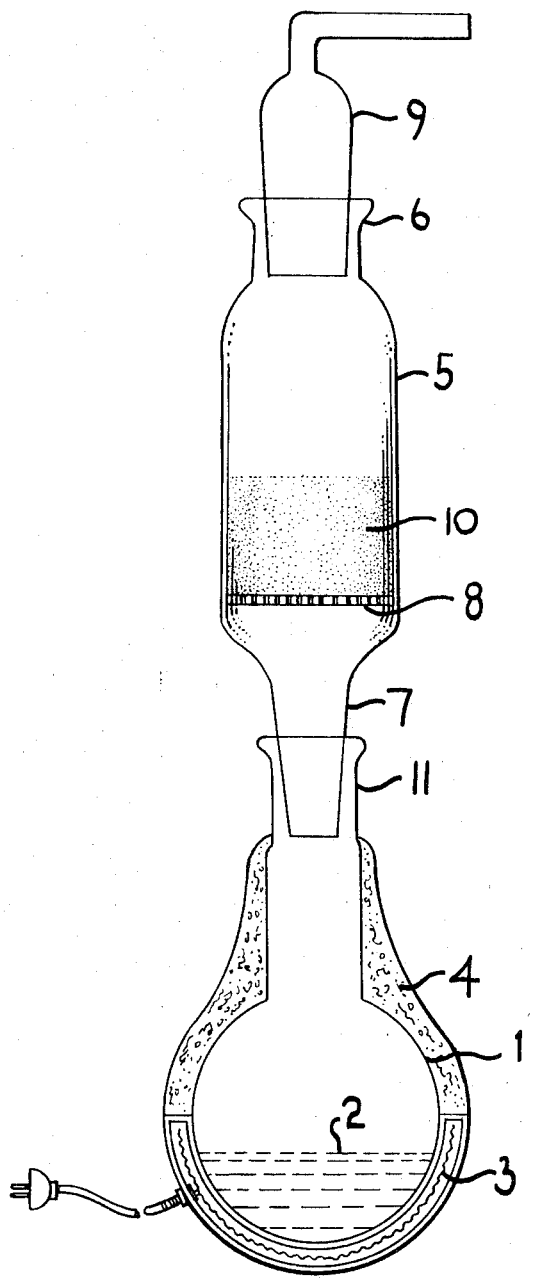

3,637,778
SYNTHESIS OF TETRAMETHYL LEAD
Ronald S. Bartlett, Corpus Christi, Tex., assignor to
PPG Industries, Inc., Pittsburgh, Pa.
Filed Sept. 23, 1969, Ser. No. 860,311
Int. Cl. C07f 7/24
U.S. Cl. 260—437 R                            8 Claims

ABSTRACT OF THE DISCLOSURE

A process for making tetramethyl lead in good yields using an aluminum-mercury catalyst is shown. The mixtures of aluminum-mercury or aluminum amalgams shown contain varying quantities of mercury, generally 0.2 to 50 percent by weight. The conventional methyl halide and sodium lead alloy feeds are employed. Temperatures are typically 100 to 120° C. and reactions are conducted in conventional autoclaves.

BACKGROUND OF THE INVENTION

In recent years the manufacture of tetramethyl lead has increased substantially in the United States as the demand for tetramethyl lead in industry has increased. Unlike tetraethyl lead synthesis utilizing sodium lead alloys and alkyl halides in a non-catalytic system, the manufacture of tetramethyl lead has required the utilization of a catalyst. One of the more widely used catalysts for the production of tetramethyl lead has been diethyl aluminum chloride. This has been used either by itself or as described in recent patent literature it has been utilized together with various ethers.

Despite its usefulness in the manufacture of tetramethyl lead, the ultimate product recovered from the reactors or autoclaves in which this catalyst has been used contains large quantities of materials other than the desired tetramethyl lead as various lead complexes. Thus, while this particular catalyst is especially useful in manufacturing tetramethyl lead in high yields from a methyl chloride-sodium lead alloy process system, the search for a suitable, high yield tetramethyl lead catalyst which will produce tetramethyl lead and tetramethyl lead only continues.

THE PRESENT INVENTION

In accordance with the instant invention a novel catalyst has been discovered which, when utilized in the manufacture of tetramethyl lead from sodium lead alloy in the presence of methyl chloride, results in the production of tetramethyl lead in high yields and without the concomitant manufacture of side reaction products in any appreciable amounts. Thus, the methylated lead product produced in accordance with the teachings of the instant invention consists essentially of tetramethyl lead. So long as the methyl chloride used in the reaction is maintained in a high state of purity so that no other alkyl groups are introduced in the reaction system, the product will contain exclusively tetramethyl lead and in yields comparable to those obtained by using conventional aluminum catalysts such as diethyl aluminum chloride.

In conducting the reactions of the instant invention, recourse to a catalyst which is essentially aluminum amalgam or a mixture of aluminum and mercury is had. There does not appear to be any particular criticality in the quantity of mercury contained in the aluminum amalgam or aluminum-mercury mixture. Thus, mercury contents of from 0.2 to 50 percent by weight basis the weight of the mixture or amalgam may be employed to prepare tetramethyl lead with success. Preferably, in conducting reactions in accordance with this invention, the concentration of mercury in the catalyst is maintained between 1 percent to about 5 percent by weight mercury based on the total weight of the aluminum-mercury mixture.

For a clearer understanding of the instant invention reference is made to the accompanying drawing in which there is shown equipment suitable for use in the manufacture of the aluminum-mercury catalyst used in synthesizing tetramethyl lead in accordance with the teachings of the instant invention.

In the figure there is shown a glass reactor 5, fitted with a fritted glass disc 8 positioned above a constricted end member 7 on the lower end of reactor 5. The neck 6 of the reactor 5 is provided with a tubular elution tube 9 which is connected to a vacuum pump and cold trap system (not shown). The constricted member 7 is fitted to the neck 11 of flask 1. The flask has a pool of mercury 2 positioned inside of it and has its lower half covered by a heating mantle 3. The upper and neck portion of the flask 1 is covered by insulation 4. The reactor 5 has placed in it on the glass disc 8 a bed of aluminum particles 10.

Briefly the equipment shown in the drawing is utilized to manufacture the aluminum amalgam or aluminum-mercury mixtures used in the practice of this invention in the following manner. The flask 1 is charged with a pool of mercury 2. The reactor 5 is fitted into the neck 11 of flask 1 at its constricted portion 7. The reactor 5 is provided with a fritted glass disc 8 having a bed of aluminum metal particles 10 positioned on the disc 8. The neck 6 of the reactor is connected to a vacuum pump via elution pipe 9. The heating mantle 3 is activated by inserting the plug member 12 into a suitable electrical outlet. The mercury 2 in the flask is vaporized and passes up through the glass disc 8 and the bed 10 of aluminum particles thoroughly contacting each of the particles during its passage through the bed 10. When the particles in bed 10 are thoroughly wetted, the heating mantle is turned off. The particles of aluminum are then washed with an inert, oxygen free organic liquid to recover excess mercury. The aluminum-mercury catalyst is utilized in the preparation of tetramethyl lead using pressurized reactors or autoclaves in the conventional manner. Thus, typically the aluminum-mercury catalyst prepared as above described is placed in an autoclave and the autoclave is charged with alkyl halide such as methyl chloride and sodium lead alloys. The reaction which occurs may be conveniently expressed by the following equation:

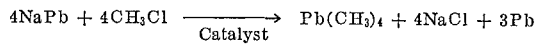

$$4NaPb + 4CH_3Cl \xrightarrow{\text{Catalyst}} Pb(CH_3)_4 + 4NaCl + 3Pb$$

Since the catalyst, unlike the conventional diethyl aluminum chloride catalyst, fails to introduce any alkyl groups other than the methyl group supplied by the methyl halide, the product is essentially pure tetramethyl lead (i.e. it contains 99.5 percent or more tetramethyl lead).

For a more complete understanding of the instant invention, reference is now made to the following examples which demonstrate the effectiveness of the novel process herein described.

EXAMPLE I

Equipment similar to that shown in the drawing was employed to manufacture catalyst to be utilized in the preparation of tetramethyl lead in a laboratory autoclave. The glass reactor 5 was charged with 50 grams of aluminum powder 10 placed on a coarse fritted glass disc 8. Below the disc, the reactor 5 was fitted into a 250 milliliter round bottom flask 1 which contained therein a pool of mercury 2. The mercury pool 2 filled approximately half the volume of the flask. At the top of the reactor 5, tube 9 led to a cold trap and vacuum pump (not shown). Insulation 4 was provided over the upper half of the flask 1. The equipment was kept under 649 millimeters of mercury continuous vacuum. A heating mantle 3 surrounding the bottom half of the flask 1 was activated and a temperature of 255° C. maintained on the mercury to provide refluxing of the mercury. The mercury vapors evolved from the heating of the mercury contained in the flask 1 passed through the fritted glass disc 8 and the bed of aluminum 10 and condensed above the aluminum powder. After 12 hours of passing the mercury vapors through the bed of aluminum powder 10, the reactor was cooled. The powder was removed from reactor 5 and slurried in benzene. The slurry of powder was then filtered and dried. Analyses were made on two riffled portions of the powder. All handling and sampling of the powder before and after treatment with the mercury vapors was done in a nitrogen atmosphere. The two portions of powder analyzed contained 2.17 and 2.18 percent mercury by weight.

Aluminum-mercury powder so prepared and containing 2.17 percent by weight mercury basis the weight of the powder was used to conduct a series of runs synthesizing tetramethyl lead. The reactions were conducted in a stainless steel laboratory autoclave which was charged with 0.2 mole of sodium lead alloy screened to —¼ inch +40 mesh, between 1.07 and 1.35 moles of methyl chloride and 4 mole percent of aluminum basis the lead used. The aluminum was fed as aluminum-mercury powder. The temperature of the autoclave, reaction times and the results of the runs made under these conditions are listed below in Table I:

TABLE I

| | Temperature (° C.) | Time (hours) | Sodium reacted (percent) | TML (yield percent basis Na charged) | |
|---|---|---|---|---|---|
| | | | | By GC [1] | By EDTA [2] |
| Run: | | | | | |
| 1 | 100 | 4 | 88.9 | 74.5 | 76.8 |
| 2 | 100 | 3 | 85.5 | 68.8 | 66.7 |
| 3 | 100 | 2 | 85.4 | 74.5 | 71.8 |
| 4 | 110 | 4 | 92.1 | 76.0 | 80.5 |
| 5 | 110 | 3 | 92.2 | 71.9 | 71.8 |
| 6 | 110 | 3 | 93.1 | 77.3 | 77.8 |
| 7 | 110 | 3 | 87.8 | 80.5 | 76.8 |
| 8 | 110 | 2 | 78.4 | 68.7 | 72.1 |
| 9 | 120 | 4 | 95.5 | 76.0 | 81.7 |
| 10 | 120 | 3 | 91.3 | 72.4 | 76.4 |
| 11 | 120 | 2 | 93.1 | 75.4 | 78.5 |

[1] GC=Analysis by gas chromatograph.
[2] EDTA=Analysis by ethylenediaminetetraacetic acid titration.

EXAMPLE II

A batch of aluminum-mercury catalyst was prepared by placing 123.4 grams of aluminum powder and an equal weight of mercury in a 16 ounce glass sample bottle. The contents of the bottle were mixed by rotating the bottle end over end at 60 revolutions per minute for 1 hour. The mixture was then transferred to a 32 ounce bottle and tumbled for another 30 minutes. The solid appeared well mixed.

A series of experiments to produce tetramethyl lead from methyl chloride and sodium lead alloy were conducted in a stainless steel laboratory autoclave using aluminum-mercury catalyst having a 50 percent by weight mercury content prepared as above. The feed to the autoclave in all of the runs consisted of 1 mole methyl chloride and 0.2 mole sodium lead alloy. The catalyst concentration in the charge was 1 mole percent aluminum basis the alloy charged on the 50-50 weight percent aluminum-mercury catalyst used. The conditions used during several runs and the results obtained are tabulated in the following Table II:

TABLE II

| | Temperature (° C.) | Time (hours) | TML yield, percent | |
|---|---|---|---|---|
| | | | By GC [1] | By EDTA [2] |
| Run: | | | | |
| 1 | 100 | 3 | 85.9 | 81.8 |
| 2 | 100 | 3 | 73.8 | 76.7 |
| 3 | 100 | 3 | 73.3 | 74.8 |

[1] Gas chromatographic analysis.
[2] Ethylenediaminetetraacetic acid titration method.

In a series of further experiments an aluminum-mercury catalyst was prepared as above described in Example I using equipment such as shown in the drawing. The aluminum powder used was a 270 mesh size particle. The mercury vapors were passed through the bed 10 containing 270 mesh aluminum particles in reaction zone 5 for 24 hours. The excess mercury was removed by slurrying the mercury treated powder in hexane. An aluminum-mercury powder of 270 mesh size was thus prepared and contained 0.29 percent by weight mercury basis the aluminum-mercury mixture.

The aluminum-mercury composition or amalgam thus prepared was used as catalyst for the preparation of tetramethyl lead from methyl chloride and sodium lead alloy. The feed composition was placed in a stainless steel laboratory autoclave in which the reaction was conducted. Several runs were made each with a charge of 0.202 mole of —¼" +40 mesh sodium lead alloy being used. The catalyst containing 0.29 percent by weight mercury was used in a concentration of 4 mole percent basis the aluminum contained therein. Each run was conducted for a period of 180 minutes. The quantity of methyl chloride employed was varied for the three runs shown and the quantities employed, the conditions of the reaction and the results are shown below in Table III:

TABLE III

| | Methyl chloride feed (mole) | Temperature (0° C.) | Tetramethyl lead yield (EDTA) [1] |
|---|---|---|---|
| Run: | | | |
| 1 | 1.23 | 100 | 76.8 |
| 2 | 1.21 | 115 | 74.6 |
| 3 | 1.40 | 115 | 75.2 |

[1] Ethylenediaminetetraacetic acid titration method.

In the above Examples I, II and III the catalyst concentration in mole percent aluminum is calculated on the moles of aluminum feed as aluminum-mercury catalyst per mole of sodium lead alloy charged. Thus, a 4 mole percent catalyst concentration means an aluminum concentration in the reaction zone equivalent to 4 moles of aluminum per 100 moles of sodium lead alloy present.

As can be readily appreciated from the above examples, utilizing the catalyst of the instant invention tetramethyl lead can be synthesized in high yields and without the concomitant production of other alkyl lead compounds.

While the invention has been described with reference to certain specific operating apparatus, it is of course to be understood that it is not limited by this apparatus. Any conventional pressure equipment can be employed so long as it can withstand the pressures and environment encountered in a tetramethyl lead alkylation system. The reaction zone in the autoclave may be provided with agitation by rocking the autoclave during reaction or by providing mechanical methods of stirring the reaction mass internally such as by the employment of scrapers and stirring blades.

The temperature of the reaction is subject to considerable variation. Any temperature which will sustain the alkylation reaction is suitable. In general, the temperature ranges between 100 to 120° C., preferably between 110 or 115° C. to produce the tetramethyl lead from methyl chloride and sodium lead alloys.

Reaction times are also quite variable and generally range between ½ to 5 hours. Preferably, in conducting the reactions in accordance with this invention, reaction times of between 1 to 3 hours are employed. Any temperature is sufficient which permits the alkylation reaction to take place.

The sodium lead alloy utilized in accordance with the instant invention is preferably maintained in a particle size ranging from —¼" to +40 mesh. The size is subject to wide variation however and an alloy may conveniently range from 3 to 325 mesh.

The catalyst particles described herein are controlled in size by selecting or screening aluminum powders prior to mercury deposition to the desired size range. The range employed does not appear critical and both fine and coarse particles have been used with success to produce tetramethyl lead. Thus, particles ranging from 30 to 325 mesh (U.S. Sieve Series) may be used. Preferably, particles in the range of 100 to 325 mesh are used. The mercury content, as has been stated, generally ranges between 0.2 to 50 weight percent basis the total weight but can be more or less than these quantities. The lower limit on mercury is that quantity which when added to the aluminum will catalyze the alkylation of the lead in a sodium lead alloy. Quantities of mercury above 50 percent can be used though they add to the overall cost of process unnecessarily.

The reactions of the instant invention may be carried out under the autogeneous pressure of the reaction system. Pressures may be controlled by controlling the rate of addition of methyl halide to the system, by venting and by cooling of the reaction mass to maintain it at any desired level. Typically, pressures in the range of from 50 to 1,000 p.s.i.g. are encountered. Preferably, pressures are controlled between 75 to 350 p.s.i.g.

While the invention has been described with methyl chloride as the typical methyl halide employed, methyl bromide and methyl iodide may also be employed.

I claim:
1. A method of preparing tetramethyl lead comprising reacting methyl halide and sodium lead alloy in the presence of a catalyst comprising aluminum amalgam.
2. A method of preparing tetramethyl lead comprising reacting methyl chloride with sodium-lead alloy in a reaction zone in the presence of a catalyst comprising aluminum amalgam.
3. The method of claim 1 wherein the aluminum amalgam catalyst contains between 0.2 to 50 percent by weight mercury.
4. The method of claim 2 wherein the aluminum amalgam catalyst contains between 0.2 to 50 percent by weight mercury.
5. A method of preparing tetramethyl lead comprising reacting methyl chloride and sodium lead alloy in a reaction zone in the presence of an aluminum amalgam catalyst, the mercury content of the catalyst being at least 0.2 percent by weight.
6. A method of preparing tetramethyl lead comprising reacting sodium lead alloy with methyl chloride in the presence of aluminum amalgam catalyst in an autoclave, said reaction being conducted for at least 1 hour at temperature above 100° C., the concentration of catalyst employed being at least 1 mole percent aluminum basis the lead alloy used.
7. The method of claim 6 wherein the mercury content of the catalyst is at least 0.2 percent by weight.
8. The method of claim 6 wherein the mercury content of the catalyst is between 0.2 to 50 percent by weight.

References Cited

UNITED STATES PATENTS

| | | | |
|---|---|---|---|
| 2,270,109 | 1/1942 | Calingaert et al. | |
| 2,414,058 | 1/1947 | Pearsall | 260—437 |
| 3,048,610 | 8/1962 | Jarvie et al. | 260—437 R |
| 3,113,955 | 12/1963 | Sandy | 260—437 R |
| 3,357,928 | 12/1967 | Kobetz et al. | 260—437 R |

FOREIGN PATENTS

| | | | |
|---|---|---|---|
| 761,844 | 11/1956 | Great Britain | 260—437 |

TOBIAS E. LEVOW, Primary Examiner

H. M. S. SNEED, Assistant Examiner